Nov. 21, 1967 B. E. SHLESINGER, JR 3,354,434

CIRCUIT PROGRAMMING SYSTEM AND METHOD

Filed Jan. 17, 1964 6 Sheets-Sheet 1

INVENTOR
Bernard Edward Shlesinger, Jr.

BY Shlesinger, Shlesinger & Arkwright
ATTORNEYS

INVENTOR
Bernard Edward Shlesinger, Jr.

BY Shlesinger, Shlesinger & Arkwright

ATTORNEYS

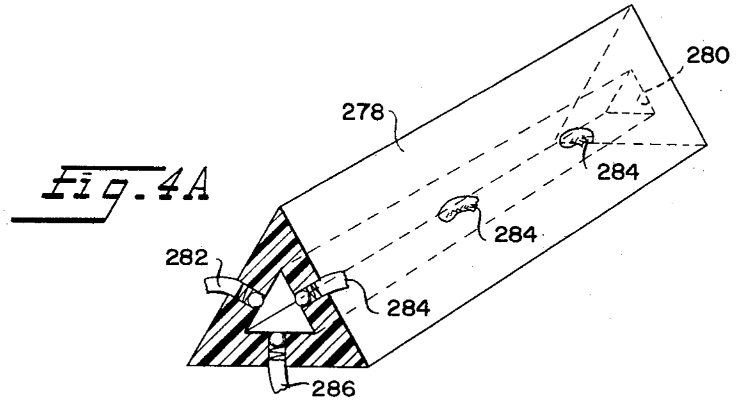
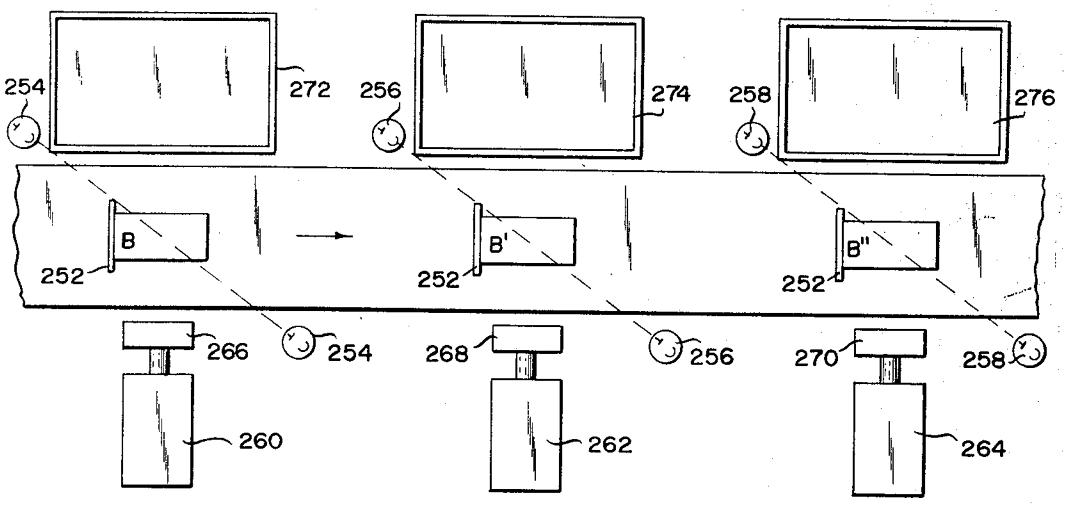
FIG. 5
FIG. 6
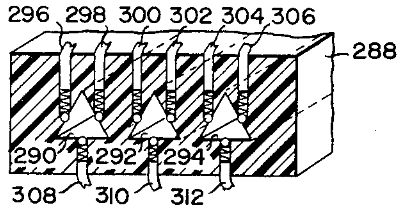
FIG. 8
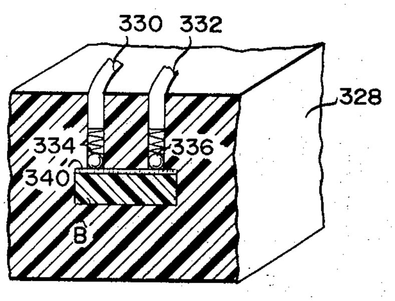
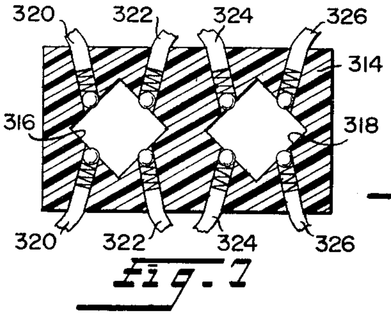
FIG. 7
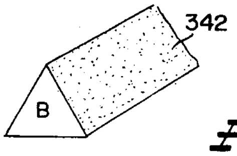
FIG. 9
FIG. 10
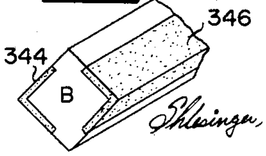
INVENTOR
Bernard Edward Shlesinger, Jr.
Shlesinger, Shlesinger + Arkwright
ATTORNEYS

CIRCUIT PROGRAMMING SYSTEM AND METHOD

Filed Jan. 17, 1964 6 Sheets-Sheet 4

INVENTOR
Bernard Edward Shlesinger, Jr.

BY Shlesinger, Shlesinger & Arkwright
ATTORNEYS

INVENTOR
Bernard Edward Shlesinger, Jr.

BY Shlesinger, Shlesinger & Arkwright
ATTORNEYS

Nov. 21, 1967 B. E. SHLESINGER, JR 3,354,434

CIRCUIT PROGRAMMING SYSTEM AND METHOD

Filed Jan. 17, 1964 6 Sheets-Sheet 6

INVENTOR
Bernard Edward Shlesinger, Jr.

BY Shlesinger, Shlesinger & Arkwright
ATTORNEYS

United States Patent Office 3,354,434
Patented Nov. 21, 1967

3,354,434
CIRCUIT PROGRAMMING SYSTEM AND METHOD
Bernard Edward Shlesinger, Jr., 3906 Bruce Lane, Annandale, Va. 22003
Filed Jan. 17, 1964, Ser. No. 338,478
14 Claims. (Cl. 340—147)

ABSTRACT OF THE DISCLOSURE

A programming switch system comprising billet dispenser means and a switch block having a multisided passageway including a series of switch contact members in the passageway and a plurality of multisided billets in the billet dispenser means each having a cross-sectional configuration corresponding to and cooperating with said passageway and having at least one non-conducting surface and at least one conducting surface, means for programming, orienting, and inserting a plurality of the billets sequentially in the passageway, whereby when said programmed and oriented billets are inserted in the passageway, the conductive surfaces of the billets will complete an electrical path between selected switch contact members in the switch block when moved into contact therewith.

This invention relates to circuit programming systems for use in the operation of pressure type or contact type multiple switches. The system is designed for automatic programming of block switches for use in telegraphy, telephony, telemetering, computing and the like. This invention is analogous to the inventions set out in my copending applications Serial No. 268,321 filed March 27, 1963, for Multiple Contact Programming System Having Reciprocating Action, now Patent 3,166,645 issued January 19, 1965; Serial No. 213,977, filed August 1, 1962, for Multiple Contact Switch Programming System, now Patent 3,193,630 issued July 6, 1965; and Serial No. 322,659, filed November 12, 1963 for Magnetic Multiple Contact Programming Switch System now Patent 3,261,941 issued July 19, 1966; and in certain respects is an improvement thereon.

In my previous applications, no provision was made for automatically rearranging the circuit opening and closing devices. In the above mentioned applications, the system had to be shut down for purposes of inserting a new belt, cable, or the like.

It is an object of this invention to provide a continuous system of programming which permits rearranging of the circuit operators in order to change the programming system during its working operation. This avoids delays, shutdowns, and the like.

Another object of this invention is to provide a simple circuit selecting system which is simple to operate and relatively easy and inexpensive to construct.

Yet a further object of this invention is to provide a programming system having a plurality of individual circuit opening and closing units which can be arranged in any desired order for opening and closing any desired series of circuits in a particular order and at a particular time.

Another object of this invention is to provide a circuit opening and closing billet which is light in weight, inexpensive and readily replaceable when worn.

A further object of this invention is to provide a multiple contact switching construction which can be used in the nature of a cross-bar switch.

Still a further object of this invention is to provide a switching system which provides for opening and closing a plurality of different circuits simultaneously or in various timed or selected sequences.

These and other objects and advantages of this invention will be apparent from a reading of the following description and claims:

In the drawings:

FIGURES 2, 3 and 5 show in schematic another system utilizing the principles of this invention; in which FIGURE 2 shows the dispenser feeder section, FIGURE 3 shows partly in section the contact block and its relationship to the billets, and FIGURE 5 shows the return conveyor section.

FIGURES 4 and 4A illustrate various types of contact blocks which could be used in the system proposed.

FIGURES 6 and 7 show blocks having multiple passageways therein for receiving said circuit contact connectors.

FIGURE 8 shows a contact block in cross-section with the top surface of the billet conductive so as to close the particular switch.

FIGURES 9 and 10 are fragmentary perspective views of two different modifications of the billets used in this invention, one being triangular and the other being diamond shaped.

FIGURES 12, 13, 14 and 15 disclose a further embodiment of this invention in schematic relationship having parts of the system illustrated by cross-section and by breaking away portions of the system.

Figure 16:
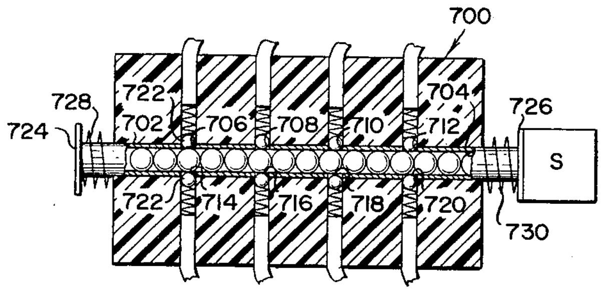

FIGURE 16 illustrates one method of immobilizing the switch block.

Figure 17:
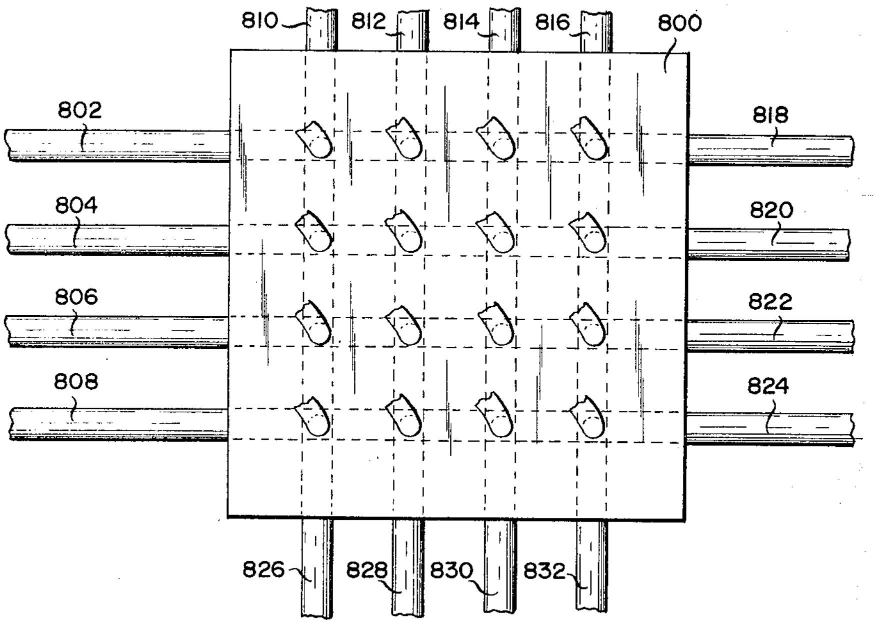

FIGURE 17 shows a fragmentary plan view illustrating the cross-bar switching arrangement of this invention.

Figure 18:
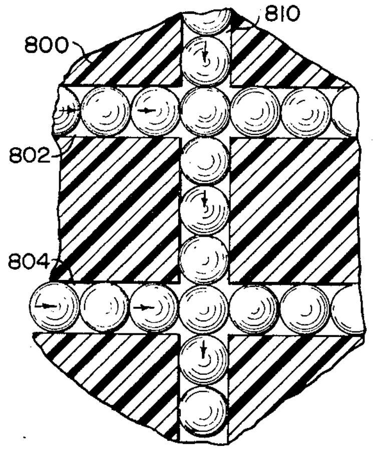

FIGURE 18 is an enlarged fragmentary view in cross-section of the modification shown in FIGURE 17 illustrating the method of displacing the circuit making and breaking members.

Figure 1:
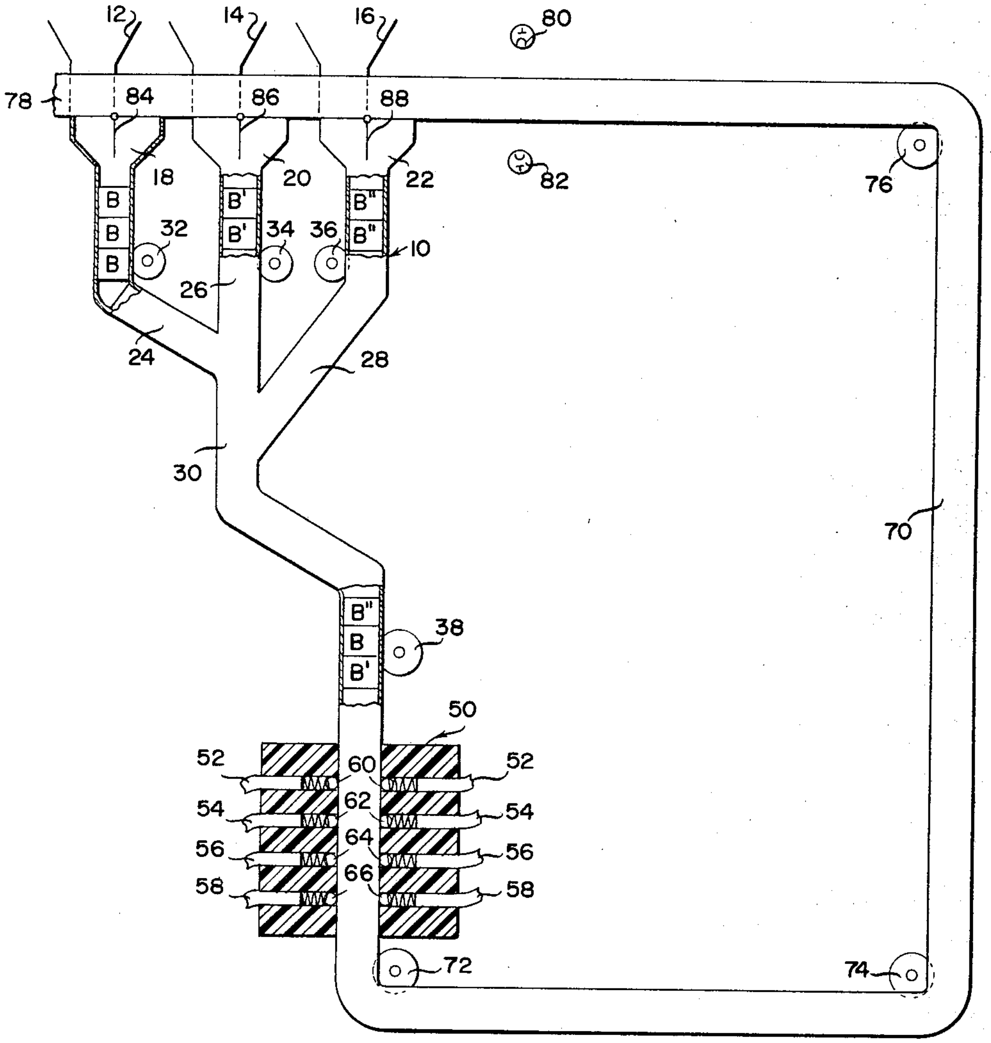
FIGURE 1 shows in schematic form, one type of system utilizing the principles of this invention.

*FIGURE 1.—Modification and operation*

In FIGURE 1, the programming system comprises a dispenser feed conveyor mechanism 10, a circuit block 50, and a return conveyor system 70.

Mechanism 10 includes a series of hoppers 12, 14 and 16 into which billets B, B′ and B″ are initially deposited. From the hoppers 12, 14 and 16 the billets travel into a second series of hoppers 18, 20 and 22. All of the hoppers aforementioned are a part of a conveyor system which includes branch conveyors 24, 26, and 28 connected to a header conveyor 30. The branch conveyors 24, 26 and 28 include feeder wheels 32, 34 and 36 which feed the billets B, B′ and B″ as desired to the branch conveyors 24, 26 and 28 and thence to the header conveyor 30. Any type of feed mechanism can be used; however, the feed wheels 32, 34 and 36 maintain the billets in position by friction engagement therewith and upon rotation allow the billets to drop individually into the header conveyor from the selected hoppers 18, 20 and 22. The billets B, B′ and B″ are provided with circuit opening and closing means as hereinafter described which will operate to control selected circuits in the block 50.

A feeder roll 38 is connected to the header conveyor for feeding the billets directly into the block 50.

The block 50 may be of any of the general types illustrated in my copending applications Serial No. 268,321 filed March 27, 1963, for Multiple Contact Programming System Having Reciprocating Action, Serial. No. 213,977, filed August 1, 1962, for Multiple Contact Switch Programming System, and Serial No. 322,659 filed November 12, 1963 for Magnetic Multiple Contact Programming Switch System and the billets B B' and B'' may be either conductive, non-conductive, magnetic, or the like. The block 50 includes a series of leads 52, 54, 56 and 58. The leads may be connected to pressure sensitive type switches, magnetic type switches, or to contact points 60, 62, 64 and 66.

When the billets enter the block 50, depending upon the order and arrangement in the conveyor head 30, the circuits will be closed as determined by the billet selected. As will be explained hereinafter, it is possible to connect circuits 52 with circuits 54 etc. by proper selection of the billets. It will be obvious that the circuits can be maintained in a deactivated state until such time as the desired billets are positioned within the block. A central power supply switch could be utilized to maintain all of the circuits deactivated until the billets are positioned.

Return feed conveyor 70 includes feed rollers 72, 74 and 76 which return the billets to the supply hoppers 18, 20 or 22. If the supply hoppers 18, 20 and 22 are full, the billets can be shunted to a special receptable (not shown) by means of the receptacle conveyor leg 78.

In association with the return conveyor 70, is a photocell system comprised of photocells 80 and 82. The billets from each hopper are distinguished one from the other by some type of light reflective means. This may consist of a difference in the surface configuration of the billet or a difference in the color of the billet. The photocells 80 and 82 will operate valves 84, 86, and 88 in the conveyor 70 to permit the billets to drop into their respective hoppers 18, 20 and 22 when opened. When the valves 84, 86 and 88 are closed, the billets will by-pass the hoppers and enter into the leg 78 of the return feed conveyor for storage. The details of the photocell circuit and valve arrangement is not shown as any type of valving system operated by a photocell could be utilized. It would be obvious from the drawings that when a billet designed for hopper 18 is detected by the photocell, the valve 84 will open and the valves 86 and 88 will remain closed so that the billet will by-pass the hoppers 20 and 22 for depositing into the hopper 18. Similarly, the other billets, each having distinguishing means, will be selectively deposited in their proper hoppers or in the case where the hoppers are full, in the storage hopper (not shown) leading from conveyor sleeve 78.

It will be obvious that additional hoppers may be provided including other variations of billets enabling additional changes in circuit operation of the block 50. For purposes of illustration, only three hoppers are shown.

*FIGURES 2 through 11.—System and operation*

Figure 2:
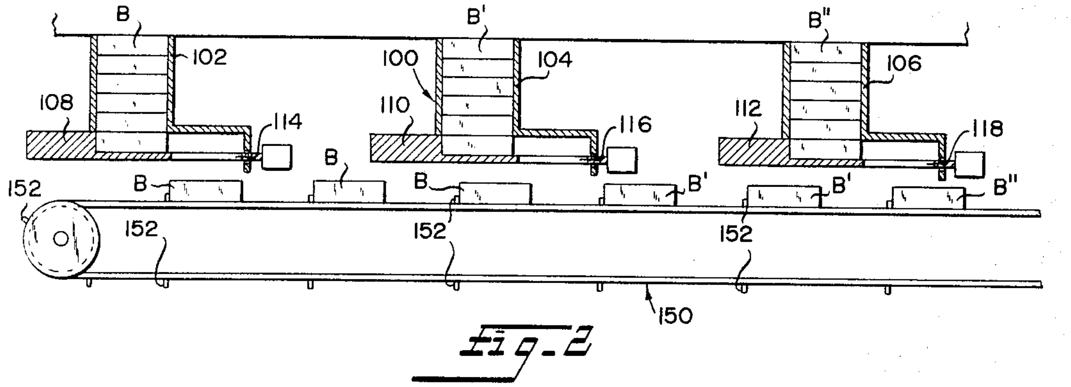
Figure 3:
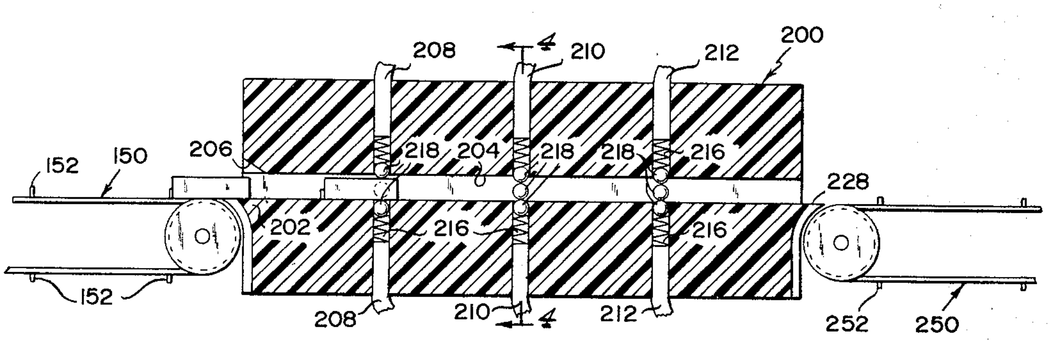

FIGURES 2, 3 and 5 show a slightly different system from that illustrated in FIGURE 1. The system shows in general a dispenser mechanism 100, a feed conveyor 150, a circuit block 200, and a return conveyor 250. The dispenser mechanism as illustrated in FIGURE 2 generally shows dispenser chutes 102, 104 and 106. The dispenser chutes are provided with the reciprocating slide members 108, 110 and 112. The slide members have an opening 114, 116 and 118 therein which permits the billets B, B' and B'' which are stacked in the chutes 102, 104 and 106 to be dropped therethrough when the slide valves 108, 110 and 112 are shifted to the right and returned to the position as shown in FIGURE 2. The shifting of the slide valve to the right moves the bottom billet B to the right and permits the next billet in the chute to drop in beside it. Upon return of the slide to its position shown in FIGURE 2, the billet will then drop through the respective openings 114, 116 and 118. It is obvious that any other desirable dispensing mechanism may be used.

Figure 4:
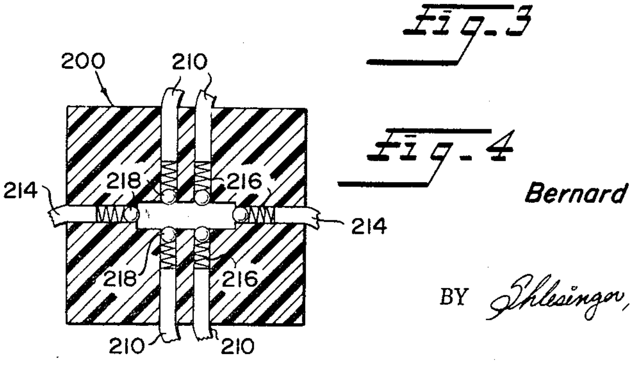

The billets are selectively dropped on the feed conveyor 150 and are moved along in a positive manner by means of pushers 152. When the billets B, B' and B'' reach the end of the belt conveyor 150, they proceed from the belt onto an apron 202 of the block 200 and are shoved forward into the passageway 204 by means of the pushers or lugs 152. A chamfer 206 on the entrance of the passageway 204 permits ease of access of the billets B, B' and B'' into the passageway. Circuit leads 208, 210 and 212 extending in a vertical fashion are provided with contacts or microswitches in the same manner as the block illustrated in FIGURE 1. Horizontal leads 214 similarly are provided with contacts or pressure members. It will be obvious that magnetic members can also be used in the manner as set out in my aforementioned application now pending. In FIGURES 3 and 4, a spring member 216 is shown biasing a conductor ball 218. The ball 218 engages the walls of the blocks or billets B, B' or B''. Depending upon the conductive wall which engages the contacts 218, circuit is made between predetermined contacts which may be side by side, opposed in a vertical direction, or angularly disposed with respect to each other. As aforementioned, the timing of the billets through the block may be used to program certain sequences. Where it is desired to load the block before opening or closing the circuits, a deactivating member for the entire block can be furnished such as a main power on and off switch.

Figures 2A, 2B, 2C, 2D, 2E:
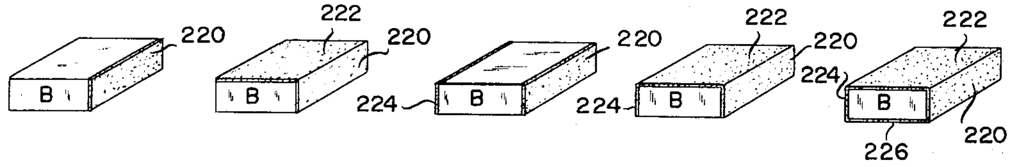
FIGURES 2A through 2E illustrate the different type of billets which can be used in either of the aforementioned systems.
Figure 11:
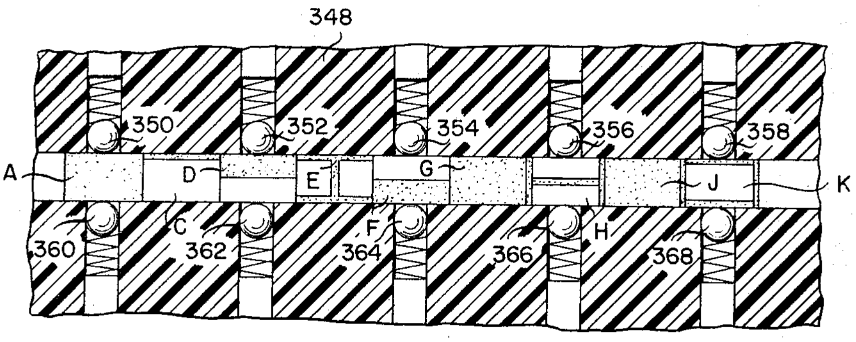
FIGURE 11 is a cross-sectional view of the block with various types of circuit making and opening connectors in said passageway.
Figure 12:
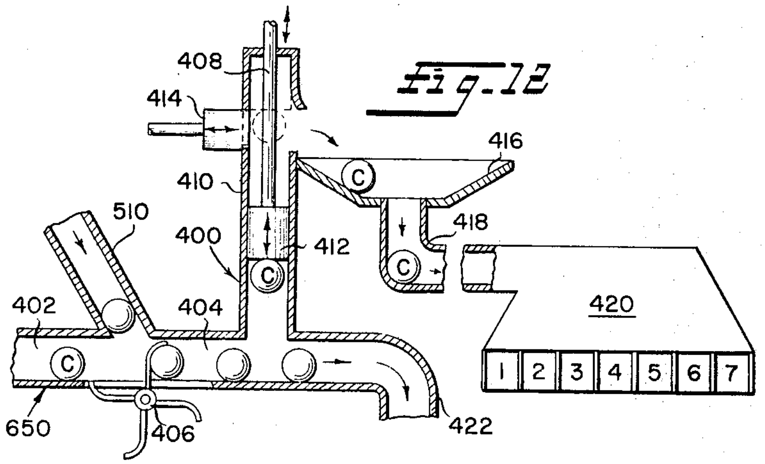
Figure 13:
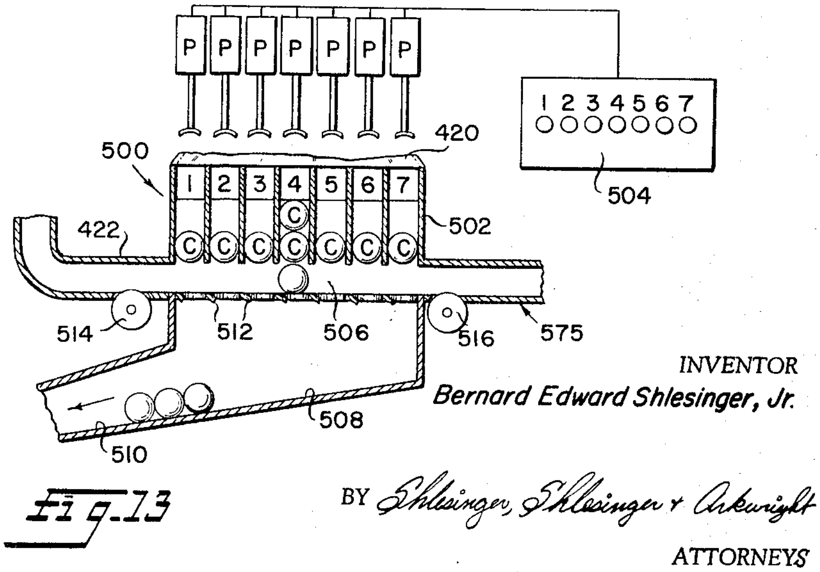

FIGURES 2A through 2E show various types of billets which may be used in controlling the circuits in the block 200. FIGURE 2A shows a billet coated on one wall 220 with a conductive surface. The other walls are nonconductive. FIGURE 2B shows the coating on two adjacent walls 220 and 222 with the other walls being nonconductive. FIGURE 2C shows the block coated on two opposed or spaced walls 220 and 224. FIGURE 2D shows the block coated on the walls 220, 222 and 224. FIGURE 2E shows the block or billet B coated on four walls 220, 222, 224 and 226. The end walls are not shown conductive but it is obvious that they also may be conductive for the purposes of providing a circuit between billets which are in abutting relation. If the end walls of the billets are roughened, a good contact will be made between billets. A certain amount of pressure will be required to force the billets into position in the block because of the load on the contact members 218. The pushers 152 will push the next block coming along on conveyor 150 against the preceding billet until the block is loaded in proper fashion. A number of billets may be nonconductive and used merely to clear the entire system. The nonconductive billets may also be used interspersed between conductive billets in order to inactivate certain circuits in the block. The programmer will know in advance the number of billets which the block itself can contain and can therefore schedule the billets in accordance with the position of the circuits as generally indicated by the leads 208, 210, 212 and 214. It is obvious that all of a side of a billet B or a portion of a side of a billet may be made conductive. FIGURE 4 as an example could contain a billet which would permit a circuit to be closed between lead 214 on the left and lead 214 on the right if the billet were a center conductive type in which the conductive area went through the billet in a sandwich fashion as generally shown in FIGURE 11.

The block 200 is provided with a second apron 228 which guides the billets B onto the return conveyor 250. It will be obvious that for proper operation of this system, the block 200 will be normally loaded under all working conditions, the billets being removed from the block as fast as new billets being removed from the 204. The conveyor 250 is provided with pushers 252. The conveyor 250 may be an endless belt type as illustrated or may be of some other type of conveyor available in the art.

After the billets leave the block 200 and are picked up by the conveyor 250, they are carried along until they reach photocells 254, 256 and 258. The photocells are so arranged as to selectively operate when a certain configured or colored billet as before mentioned, passes the beam. A series of pusher type ejectors 260, 262 and 264 having pushers 266, 268 and 270 are electrically connected to the photocell circuit so that when a photocell is activated, a circuit to a solenoid (not shown) causes the ejectors 260, 262 and 264 and their pushers 266, 268 and 270 respectively to engage the billet which is affecting a particular photocell and to push the billet from the conveyor 250 into bins or receptacles 272, 274, 276 depending upon the billet and the particular circuit activated. It is obvious that additional bins and billets may be provided as well as detecting photocells and the like. It is further obvious that the bins 272, 274 and 276 may be connected to conveyor systems which would lead directly to their respective dispenser chutes 102, 104 and 106 illustrated in FIGURE 2. In this manner, the chutes may be continuously supplied with billets for continuous operation of the system.

FIGURE 4A which illustrates a slightly different embodiment of the block shows a triangular block 278 provided with a triangular passageway 280. Leads 282, 284 and 286 extend into the passageway in the manner illustrated in FIGURE 3 for example. An arrangement as illustrated in FIGURE 4A allows for certain variations in the circuitry as will be obvious.

FIGURE 6 shows a block having a plurality of passageways of triangular configuration therein for purposes of illustrating how parallel systems might be arranged to program a great many circuits. In FIGURE 6, the block 288 is provided with passageways 290, 292 and 294. It is to be noted that all of the leads 296 through 312 are arranged in a vertical fashion for minimizing the space.

FIGURE 7 shows a slightly different block arrangement in which the block 314 is provided with diamond shaped passageways 316 and 318. This is done primarily to provide easy positioning in manufacture of the leads 320, 322, 324 and 326 in a vertical fashion.

FIGURE 8 shows a block 328 with the leads 330 and 332 in side by side relationship with their contact members 334 and 336 engaging the conductive surface 340 of the billet B.

FIGURE 9 merely illustrates a triangular billet B with a conductive surface 342.

FIGURE 10 shows a diamond shaped billet B with conductive surfaces 344 and 346. It is to be noted that the conductive surfaces 344 and 346 are V-shaped. If the billets are placed in the block 314 of FIGURE 7 as illustrated in FIGURE 10, contacts will be made between the upper and lower vertical leads 320, 322, 324 and 326. If the billet of FIGURE 10 is turned about its axis 90°, contact will be made between leads 320 and 322 and 324 and 326 in side by side relationship both top and bottom.

FIGURE 11 shows the block 348 with contacts 350 to 368. A series of different type billets A, C, D, E, F, G, J and K are shown to illustrate various circuit arrangements. Billet A closes the circuit between contacts 350 and 360. Billet C bridges the gap between billets D and A and closes the circuit between contacts 350, 352 and 360. Billet E having a configuration of an "H" lying on its side, closes the circuit between contact 352 and contact 364 by means of the conductive surfaces in billets D, E and F. It is to be noted that contacts 362 and 354 are not energized. H provides a by-pass of the contacts 356 and 366 and permits a closing of the circuit between contact 364 and contacts 358 and 368 through the conductive surfaces of billets F, G, H, J and K.

From the above it is obvious that other type of circuit arrangements can be worked out as desired.

*FIGURES 12 THROUGH 18.—System and operation*

In the embodiment shown in FIGURES 12 through 18, a dispenser mechanism provided with a magnetic sorted 400 (FIGURE 12) and a solenoid operated billet displacement mechanism 500 dispenses a series of billets preferably of spherical configuration. The dispenser-conveyor mechanism includes a conveyor tube or tubes 575 feeding into circuit block 600. A return conveyor system generally indicated at 650 returns the billets back to the sorter 400.

The billets enter into the sorted 400 from the return conveyor system 650 through a feeder tube 402. The billets utilized in this system have their entire surface either conductive or nonconductive. The conductive billets are noted by a capital C thereon whereas the nonconductive billets are not marked. The conductive billets are also of magnetic type material so that they can easily be sorted by an electromagnet or the like. The billets leave the conveyor sleeve or tube 402 and enter a separating tube 404, being propelled forward by a rotating pusher wheel 406. A shaft 408 in a housing 410 supports an electromagnet 412. The shaft 408 reciprocates in the housing 410 in such a fashion as to permit the electromagnet 412 to pick up the conductive billets C as they are passing through the chamber 404 and to lift them as illustrated in the dotted position to the uppermost portion of the housing 408 where they will be ejected by a pusher member 414 from the housing and into a hopper 416 and thence into a sleeve 418 which leads to a header 420. The nonconductive billets continue on through the chamber 404 into a connecting tube 422. The conductive billets which have been deposited into the header 420 pass through the openings 1, 2, 3, 4, 5, 6 and 7 into the vertical chutes 502 of the displacement dispenser and conveyor 500. Spring latch fingers (not shown) maintain the conductive billets C within the chute 502 until the operator of the system depresses one of the buttons 504 which operates one of the solenoid operated plungers P to force its selected billet downwardly into the passage 506 thereby displacing one of the nonconductive billets immediately underneath one of the openings of the chutes 502 forcing the nonconductive billet out the bottom of the passageway 506 into a trough 508 which connects to a return feed tube 510. The return feed tube has friction feed rollers (not shown) for forcing the nonconductive billets through the system and back to the sorter mechanism 400. It is to be noted that the passageway 506 is provided with a number of small fingers 512 which are resilient and permit only one billet to be displaced at a time. Feeder wheels 514 and 516 are designed to maintain the billets in proper spaced relationship beneath the chutes 502 so that operation of the pistons P will cause immediate displacement as desired.

Figure 14:
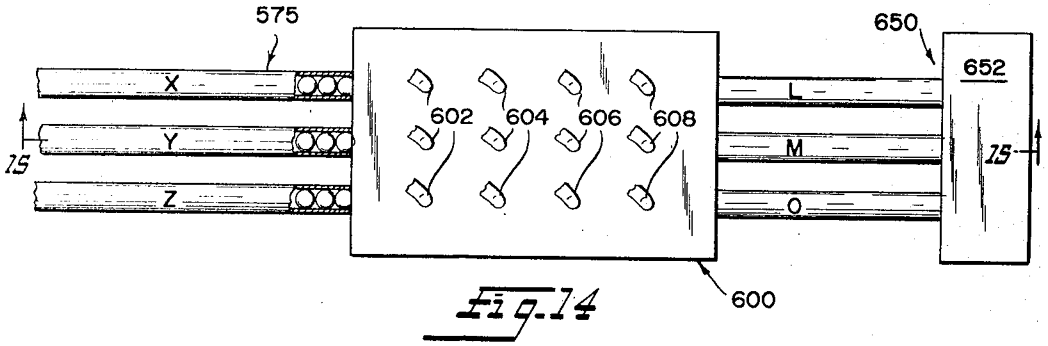
Figure 15:
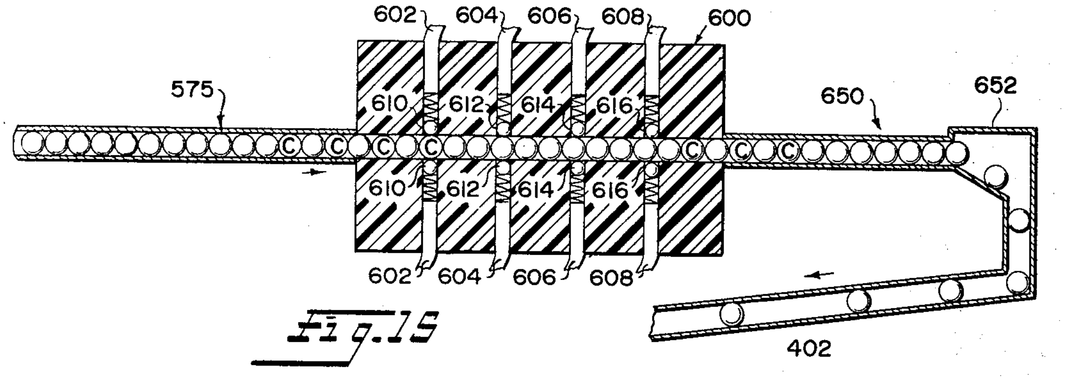

It will now be obvious that the nonconductive billets coming from the tube 422 will be mixed with the conductive billets in the desired sequence as determined by the program operator. The selected arrangement will then proceed by means of the feed roller 516 through the conveyor tube 575 to the block 600. The circuit leads 602, 604, 606 and 608 in the block 600 will be closed when the conductive billets C are positioned so as to engage the contacts 610, 612, 614 and 616. A plural number of conveyor tubes 575 as illustrated in FIGURE 14 and numbered X, Y and Z may be provided. Additional displacement mechanisms 500 will be provided for each feeder conveyor and the header 420 will be provided with branch headers for each one of the displacement mechanisms necessary.

The return conveyor system 650 may comprise a single tube or multiple tubes L, M and O. The multiple tubes will deliver the billets to an accumulator 652 which can be inclined to permit all of the billets to run toward one end for depositing in a single return delivery tube 402 for sorting in a single sorter 400. When it is desired to add or remove billets, a cover on the accumulator 652 (not shown) may be removed.

FIGURE 16 shows a conductor block 700 for use in the system illustrated in FIGURES 12 through 15. A circuit immobilizer is provided to permit the billets to be positioned in the block prior to activation of the circuits. The immobilizer consists of a sleeve 702 which is slideably fitted in the passageway 704 of the block 700. The sleeve has openings therein 706 to 720. The openings normally permit the contacts as for example 722 to drop therethrough into engagement with the billets within the sleeve 102. Flange members 724 and 726 on either end of the sleeve 702 retain spring members 728 and 730 under compression. A solenoid S is provided which will draw the sleeve to the right when activated thereby causing the contact members to be displaced so as to be out of engagement with the billets within the sleeve.

FIGURE 17 shows a circuit block 800 in which feed conveyors 802, 804, 806, 808 bring billets at right angles to additional feed conveyors 810, 812, 814 and 816. Return conveyors 818, 820, 822 and 824 are connected respectively with feed conveyors 802, 804, 806 and 808 and return conveyors 826, 828, 830 and 832 connect with feed conveyors 810, 812, 814, and 816.

FIGURE 18 illustrates how by maintaining, for example, feed lines 802 and 804 stationary, billets can be displaced when the cross feed line 810 is fed forward. Billets from the feed lines 802 and 804 will be displaced at right angles to their normal direction of travel and enter into the path of the feed line 810. A system of the type illustrated in FIGURES 17 and 18 provides for cross switching arrangements.

While the invention has been described, it will be understood that it is capable of further modifications and this application is intended to cover any variations, uses, or adaptations of the invention following in general, the principles of the invention and including such departures from the present disclosure as come within known or customary practice in the art to which the invention pertains, and as may be applied to the essential features hereinbefore set forth and as fall within the scope of the invention or the limits of the appended claims.

Having thus described my invention what I claim is:

1. A programming switch system comprising:
(a) billet dispenser means,
(b) a switch block having a multisided passageway including a series of switch contact members in said passageway,
(c) a plurality of multisided billets in said billet dispenser means each having a cross-sectional configuration corresponding to and cooperating with said passageway and having at least one non-conducting surface and at least one conducting surface,
(d) means for programming, orienting and inserting a plurality of said billets sequentially in said passageway,
(e) whereby when said programmed and oriented billets are inserted in said passageway, the conductive surfaces of said billets will complete an electrical path between selected switch contact members in said switch block when moved into contact therewith.

2. A programming system as in claim 1 and wherein:
(a) said passageway includes circuit immobilizing means.

3. A programming system as in claim 2 and wherein:
(a) said circuit immobilizing means is solenoid actuated.

4. A programming switch system as in claim 1 and including:
(a) second billet dispenser means, and
(b) a plurality of second multisided billets each having a cross-sectional configuration corresponding to and cooperating with said passageway having at least one non-conducting surface and at least two conducting surfaces.

5. A programming switch system as in claim 1 and including:
(a) a plurality of said passageways in said block, and
(b) said billets being insertable into any one of said passageways.

6. A programming switch system as in claim 5 and wherein:
(a) said passageways are disposed in crosswise relation.

7. A programming switch system as in claim 1 and including:
(a) means for substituting in said passageway certain of said billets for others of said billets.

8. A contact billet for use in a programming switch system having a switch block including a multisided passageway and a series of switch contact members in said passageway:
(a) said billet being multisided and having a cross-sectional configuration corresponding to and cooperating with said passageway, and
(b) said billet having at least one non-conductive and at least one conductive surface,
(c) said at least one conductive surface completing an electrical path between selected switch contact members in said switch block when moved into contact therewith.

9. A contact billet as in claim 8 and including:
(a) two conductive surfaces.

10. A contact billet as in claim 8 and wherein:
(a) the front surface of said billet is conductive.

11. A contact billet as in claim 8 and wherein:
(a) the rear surface of said billet is conductive.

12. A contact billet as in claim 9 and wherein:
(a) said non-conductive surface lies between and adjacent said two conductive surfaces.

13. A contact billet as in claim 9 and wherein:
(a) said two conductive surfaces abut each other.

14. A contact billet as in claim 9 and wherein:
(a) said billet includes a conductive core extending through said billet and connecting said two conductive surfaces.

References Cited

UNITED STATES PATENTS

| | | | |
|---|---|---|---|
| 2,406,031 | 8/1946 | Parker | 178—22 |
| 2,412,301 | 12/1946 | Spencer | 178—17.5 |
| 2,922,141 | 1/1960 | Simmerman et al. | 340—147 |
| 2,948,881 | 8/1960 | Berti et al. | 340—23 |

FOREIGN PATENTS

| | | |
|---|---|---|
| 28,834 | 1/1915 | Great Britain. |

THOMAS A. ROBINSON, *Primary Examiner.*